United States Patent [19]

Cartland

[11] 4,138,996
[45] Feb. 13, 1979

[54] SOLAR HEATER FREEZE PROTECTION SYSTEM

[75] Inventor: William H. Cartland, Jupiter, Fla.

[73] Assignee: Rheem Manufacturing Company, New York, N.Y.

[21] Appl. No.: 820,074

[22] Filed: Jul. 28, 1977

[51] Int. Cl.² .................................................. F24J 3/02
[52] U.S. Cl. .................................. 126/271; 237/1 A; 126/400; 137/59
[58] Field of Search .................. 126/270, 271, 400; 237/1 A, 65, 66, 8 R; 137/44, 145, 147, 170.1, 207.5, 165, 59–62; 165/18, 32

[56] References Cited
U.S. PATENT DOCUMENTS

| | | | |
|---|---|---|---|
| 2,250,341 | 7/1941 | Wünsch | 137/44 X |
| 4,013,221 | 3/1977 | Eder | 237/66 X |
| 4,048,981 | 9/1977 | Hobbs | 126/271 |
| 4,061,131 | 12/1977 | Bohanon | 126/271 |

*Primary Examiner*—Carroll B. Dority, Jr.
*Assistant Examiner*—Larry Jones
*Attorney, Agent, or Firm*—Jack N. McCarthy

[57] ABSTRACT

A solar water heating system heats water in a solar panel and stores it in a water storage tank. A pump circulates the water in the system, from the water storage tank through the solar panel back to the water storage tank when energy can be transferred from the solar panel to the water. When the circulating pump stops, the water in the solar panel and associated conduits located in an area where freezing can be encountered drains down into the water storage tank and associated conduits which are located in an area where freezing will not be encountered. In order to provide for the necessary space in the system for draining, a predetermined air space is maintained in the top of the water storage tank by an automatic air replenishment system which includes a compressor for directing compressed air into said water storage tank at the top thereof at a predetermined maximum water level in accordance with a water level float operated control located adjacent the water storage tank. The water level float device comprises a float in a cylinder having a magnet connected to the top thereof, said magnet being moved by changes in water level to in turn actuate a second magnet at a predetermined water level which operates a switch for controlling the air compressor.

7 Claims, 1 Drawing Figure

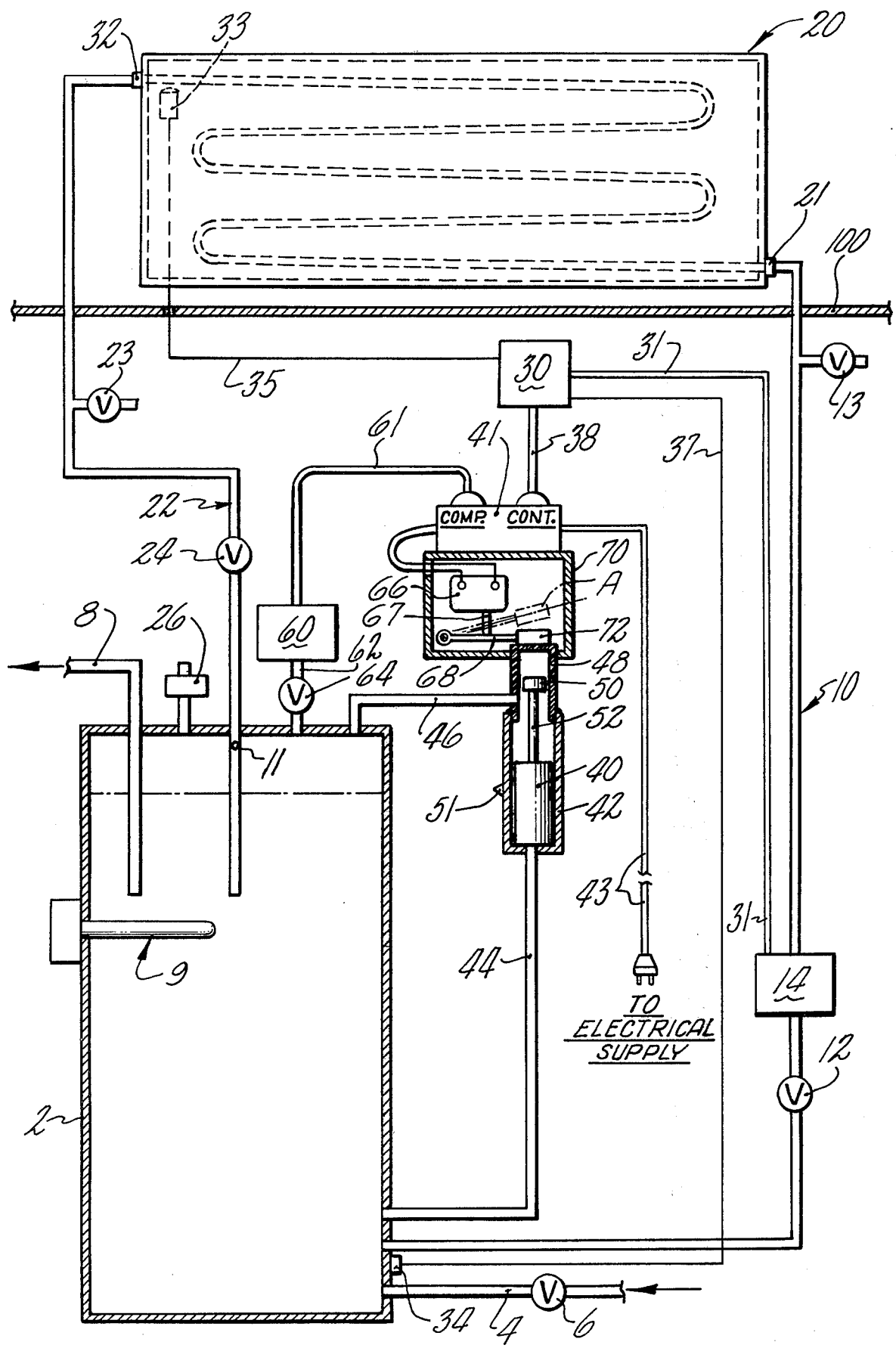

SOLAR HEATER FREEZE PROTECTION SYSTEM

BACKGROUND OF THE INVENTION

When freezing weather threatens a solar water heating system, one means of protecting the system is to drain the water from the solar panel and all conduits which could be affected by the freezing weather. After the freezing weather has left, the system can be refilled for subsequent use. Another means is to circulate the stored hot water during freezing weather which prevents freezing, but also cools the stored water; and in the event of excessive cold weather, it might be necessary to heat the water by some other means to prevent it from freezing as the stored water drops to a low temperature.

Another means used in solar water heating systems where freezing temperatures are encountered is the use of a heat exchanger means where an antifreeze solution may be added to the water used as the heat collection fluid which is subjected to the freezing temperatures.

SUMMARY OF THE INVENTION

A primary object of the present invention is to provide an improved solar water heating system which can be protected against freezing temperatures.

In accordance with the present invention, a solar water heating system is provided which drains the water in the solar panel and associated conduits located in an area where freezing can be encountered into a water storage tank and associated conduits which are located in an area where freezing will not be encountered whenever the circulating pump of the system stops.

In accordance with a further aspect of the present invention, a predetermined air space is maintained at the top of the water storage tank by an automatic air replenishment system. This space permits the system to drain properly.

In accordance with another aspect of the present invention, the automatic air replenishment system includes a compressor for directing compressed air into said water storage tank at a predetermined maximum water level in accordance with a water level float operated control. The control comprises a float in a cylinder having a magnet connected to the top thereof, said magnet being moved by changes in water level to actuate a second magnet at a predetermined water level which operates a switch for controlling the air compressor.

BRIEF DESCRIPTION OF THE DRAWINGS

The FIGURE is a schematic view of a solar water heating system including the invention.

DESCRIPTION OF THE PREFERRED EMBODIMENT

In the FIGURE, a water storage tank 2 is shown having a pressurized water supply directed to the bottom thereof through a conduit 4, and an on-off control valve 6 is placed in the conduit 4 to turn off the water supply when desired. Hot water is directed from the water storage tank 2 by a conduit 8 to an area where it is wanted. The conduit 8 extends into the water storage tank 2 to a desired location in the water contained in the storage tank 2. This location is shown just above a secondary heating device 9. This heating device 9 can be an electrical heating unit as used in many electrical water heaters. The interior of the bottom of the water storage tank 2 is connected to an inlet 21 of a solar panel 20 by a conduit means 10. The conduit means 10 includes an on-off valve 12, drain and test valve 13, and a pump 14. Pump 14 has control means 30 to be hereinafter described.

An outlet 32 of the solar panel 20 is connected by a conduit means 22 to a desired location in the water storage tank 2 to increase its efficiency. This location is at the centerline of the water storage tank 2 and extends downwardly to a point just above the heating device 9. Openings 11 are located diametrically opposed on sides of the conduit means 22 in the water storage tank 2 adjacent the top thereof for a purpose to be hereinafter described. The conduit means 22 includes an on-off valve 24 and a drain and test valve 23. A pressure relief valve 26 is located adjacent the top of the water storage tank 2. Any desired solar panel 20 can be used. A simple panel comprises a length of tubing 21 formed in a serpentine fashion and placed in a location to maximize the effect of the sun on the tubing.

To maintain a desired flow of water from the solar panel 20 to the interior of the water storage tank 2, pump 14 is actuated by a control means 30 which has one sensor 33 connected to the interior of the solar panel 20 and a second sensor 34 connected to the lower portion of the water storage tank 2. The sensor 34 can be connected to the conduit means 10 adjacent the water storage tank 2.

A sensing wire 35 connects the sensor 33 to the control means 30 and a sensing wire 37 connects the sensor 34 to the control means 30. An electrical supply is directed to the control means 30 by an electrical conduit 38 which is plugged into an electrical receptacle 41, said electrical receptacle 41 being in turn connected by an electrical conduit 43 to an electrical supply. Within electrical receptacle 41 electrical conduit 43 is directly connected to electrical conduit 38. Control means 30 is connected to the pump 14 by an electrical conduit 31. The sensor 33 is to indicate the temperature in the solar panel 20, due to the effect of the sun, and the sensor 34 is to indicate the temperature of the water at the coolest location in the water storage tank 2. When sensor 33 senses a temperature warmer than the temperature of the water at sensor 34, indicating a predetermined temperature differential, the control means 30 switches on the pump 14 and the water circulates, thereby forcing air in the solar panel 20 and conduits 10 and 22 into the top of the water storage tank 2. Continued circulation automatically results in a heat gain for the water in the storage tank 2 when the pump 14 is running. In solar water heater systems constructed, one control means 30 used switches the pump 14 on when the temperature at sensor 33 is 9° F. warmer than the temperature at sensor 34. Other temperature differentials can be used as desired. When the temperature differential is less than the predetermined value, the pump 14 is turned off by the control means 30 and the water drains down through the pump 14 into the water storage tank 2 and to the same height in connecting conduits, such as conduit means 10.

Connected to the water storage tank 2 are automatic air replenishment means to maintain an air space in the top of the water storage tank 2. This means includes a float 40 mounted for axial movement in a cylindrical housing 42. The housing 42 is fixed in relation to the water storage tank 2 and is positioned adjacent the location where the water level is desired in the water storage tank 2. This housing 42 and float 40 can be located in the water storage tank 2. The bottom of the housing 42 has its interior connected to the interior of the water storage tank 2 by a conduit 44 at a point below where the water level is desired in the water storage tank 2. The top of the housing 42 is connected to the top of the water storage tank 2 in a similar manner by conduit 46. A cylindrical extension 48 extends upwardly from the top of the housing 42 and is formed of a material not affected by magnetism. In a construction built, copper was used. A magnet 50 is located in extension 48 for axial movement and is connected to the top of the float 40 by a rod 52 for a purpose to be hereinafter described.

An air compressor 60 has its outlet connected to the top of the water storage tank 2 by a conduit 62. A check valve 64 is located in conduit 62, insuring that flow will only be into said water storage tank 2. The compressor 60 is controlled by a normally open switch 66 which is moved to a closed position by a lever arm 68. The switch 66 and lever arm 68 are mounted in a housing 70 (shown with a side plate removed) which is fixed adjacent the top of the extension 48. The lever arm 68 has a magnet 72 located on the end thereof, said lever arm 68 being pivotally mounted with the magnet 72 resting on the top of the extension 48 when there is no water in the housing 42.

As water enters the housing 42 through conduit 44, the float 40 rises, as does magnet 50. The poles of the magnets 50 and 72 are opposed and the magnetic force is of such strength that at a predetermined positioning of the magnets, the magnet 72 is repelled by magnet 50 and pivots the lever arm 68 around its axis to the dotted line position indicated at A, at which time the lever arm 68 acts on the switch 66 through rod 67 to move it to a closed position to turn on the air compressor 60 and direct compressed air into the top of the water storage tank 2. The air compressor 60 has an electrical supply directed thereto by an electrical conduit 61 which is plugged into the electrical receptacle 41. Within electrical receptacle 41, electrical conduit 43 is connected to electrical conduit 61 by one line thereof while the other line passes through the switch 66. As mentioned hereinbefore, switch 66 is a switch which is biased to a normally open position.

The housing 42 has a marking on the exterior of the housing thereof, such as a painted line, grooved line, or a raised line 51, to indicate the level at which the water in the housing 42, and also in the water storage tank 2, must be to turn the air compressor 60 on. It can be seen that as the air is forced into the top of the water storage tank 2 at a pressure greater than that of the water in the tank, the level of the water will be moved downwardly, and as the level of the water lowers the float 40 and magnet 50, at some point the magnet 72 will drop to its full-line position as shown in the FIGURE, thereby permitting switch 66 to become open and cut off the electrical supply to the air compressor 60.

As shown in the FIGURE, the solar panel 20 is located above the water storage tank 2 and the pipes of the system must be positioned so that when the pump 14 is off, the water in the system will drain through conduit means 22 and through conduit means 10 (including pump 14) downwardly toward the water storage tank 2. The openings 11 in the conduit means 22 in the water storage tank 2 permit the water in the solar panel 20, and conduit means 10 and 22 to drain by connecting the air space in the top of the water storage tank 2 to the interior of the conduit means 22. The openings 11 in the conduit means 22 allow air in the water storage tank 2 to rise into the top of the solar panel 20. This air vents the outlet 32 of the solar panel 20, thus allowing the water to drain into the water storage tank 2 and lower part of conduit means 10. Entrapment of any water in the solar panel 20, for example, would permit water to freeze therein if freezing temperatures were reached. The system is mounted so that the water storage tank 2 and associated controls are positioned in an area where freezing conditions cannot be encountered, such as in a structure below a roof 100, while the solar panel 20 and portions of the connecting conduits 22 and 10 are located externally of the roof 100 and are positioned in an area where freezing can be encountered. For optimum operation, the flow lines of the system should be insulated.

After the solar water heater has been installed and the control valve 6 is turned on to pressurize it, the system is placed at a position as shown in the FIGURE, with the water level at the desired phantom line filling conduit 8 to a hand-operated faucet (not shown) or other control where hot water is desired. Float 40 and magnet 50 will be positioned just below the position where the compressor 60 is turned on. Now, with the electrical conduit 43 connected to an electrical supply, the system is ready to operate as set forth above. The water will flow through the solar panel when called for by control means 30 and the air compressor 60 will maintain the desired air space at the top of the water storage tank 2. It can be seen that when the pump 14 is turned on, the level in the water storage tank 2 will drop to a point permitting the conduit means 10, solar panel 20 and conduit means 22 to contain flowing water. The free end of the conduit 8 in the water storage tank 2 is positioned so that it will always be below this lower level and the heating device 9 is also located in the same manner.

In a construction built, a water storage tank 2 was used having a capacity of approximately 82 gallons with the tank being approximately 5 feet (152.4 cm) in height. The heating device 9, shown as a rod, was located approximately 18 inches (45.72 cm) from the top of the water storage tank, while the free end of the conduit 8 and the free end of the conduit means 22 projected approximately 15 inches (38.1 cm) into the tank. The housing 42 was located so that the water level in the water storage tank was maintained approximately 5 inches (12.7 cm) from the top of the tank. The openings 11 were made approximately ¼ inch (0.635 cm) in diameter. The conduit means 10 and conduit means 22 comprised copper tubing ½ inch (1.27 cm) in diameter.

It can be seen that the operation of the compressor 60 can be checked by opening valve 23 to bleed air when the pump 14 is off, to permit the water level in the tank to go above the line 51.

I claim:

1. In a pressurized solar water heating system, a water storage tank, first conduit means for connecting a water supply to the lower part of said tank, a solar panel having an inlet and outlet, second conduit means connecting the lower part of said water storage tank to the inlet of said solar panel for delivering water to said solar panel for heating thereby, third conduit means connecting the outlet of said solar panel to said water storage tank for delivering heated water thereto, said water storage tank and adjacent end of said second conduit means being located in an area where freezing temperatures are not encountered, means for maintaining a pressurized air space in the water storage tank above the water, means connecting said third conduit means to said water storage tank in said air space, pump means in said second conduit means for circulating water from said water storage tank through said solar panel and third conduit means back into said water storage tank when said solar panel can add heat to said water, said solar panel being located above said water storage tank so that when said pump means is off water in said solar panel will drain into said water storage tank and adjacent end of said second conduit means, fourth conduit means for controllably directing water from said water storage tank to a desired location.

2. A pressurized solar water heating system as set forth in claim 1 wherein said means for maintaining a pressurized air space in a water storage tank above the water comprises a compressor having an outlet connected to said water storage tank.

3. A pressurized solar water heating system as set forth in claim 2 wherein said air space has a minimum volume between the top of said water storage tank and a predetermined water level in said water storage tank, means for indicating said predetermined water level, means for turning on said compressor by said indicating means when said actual water level goes over said predetermined water level and turning off said compressor by said indicating means when said actual water level goes below said predetermined water level.

4. A pressurized solar water heating system as set forth in claim 3 wherein said means for indicating said predetermined water level includes a float, said means for turning said compressor on and off including a switch, said float actuating said switch in relation to said predetermined water level to turn the compressor on when the actual water level goes over said predetermined water level and turning said compressor off when said actual water level goes below said predetermined water level.

5. A pressurized solar water heating system as set forth in claim 4 wherein said float has a first magnet connected to one end thereof, said first magnet being movable with said float, said switch having an actuating device including a second magnet, said float actuating said switch by moving said first magnet toward said second magnet to have it influence said second magnet to place said switch in a position to turn on the compressor when said actual water level goes over said predetermined water level, and moving said first magnet away from said second magnet to remove its influence and permit said switch to return to a position to turn off the compressor when said actual water level goes below said predetermined water level.

6. A pressurized solar water heating system as set forth in claim 1 wherein said third conduit means extends below the water level in said water storage tank, opening means located in said third conduit means connecting the interior of said third conduit means to said air space.

7. A pressurized solar water heating system as set forth in claim 6 wherein a secondary heating device is located in said water storage tank, said third conduit means extending below the water level to a point adjacent said secondary heating device.

* * * * *